Dec. 12, 1950        R. J. COAR        2,533,714
SUPERCHARGER CONTROL
Filed Nov. 6, 1948        2 Sheets—Sheet 1
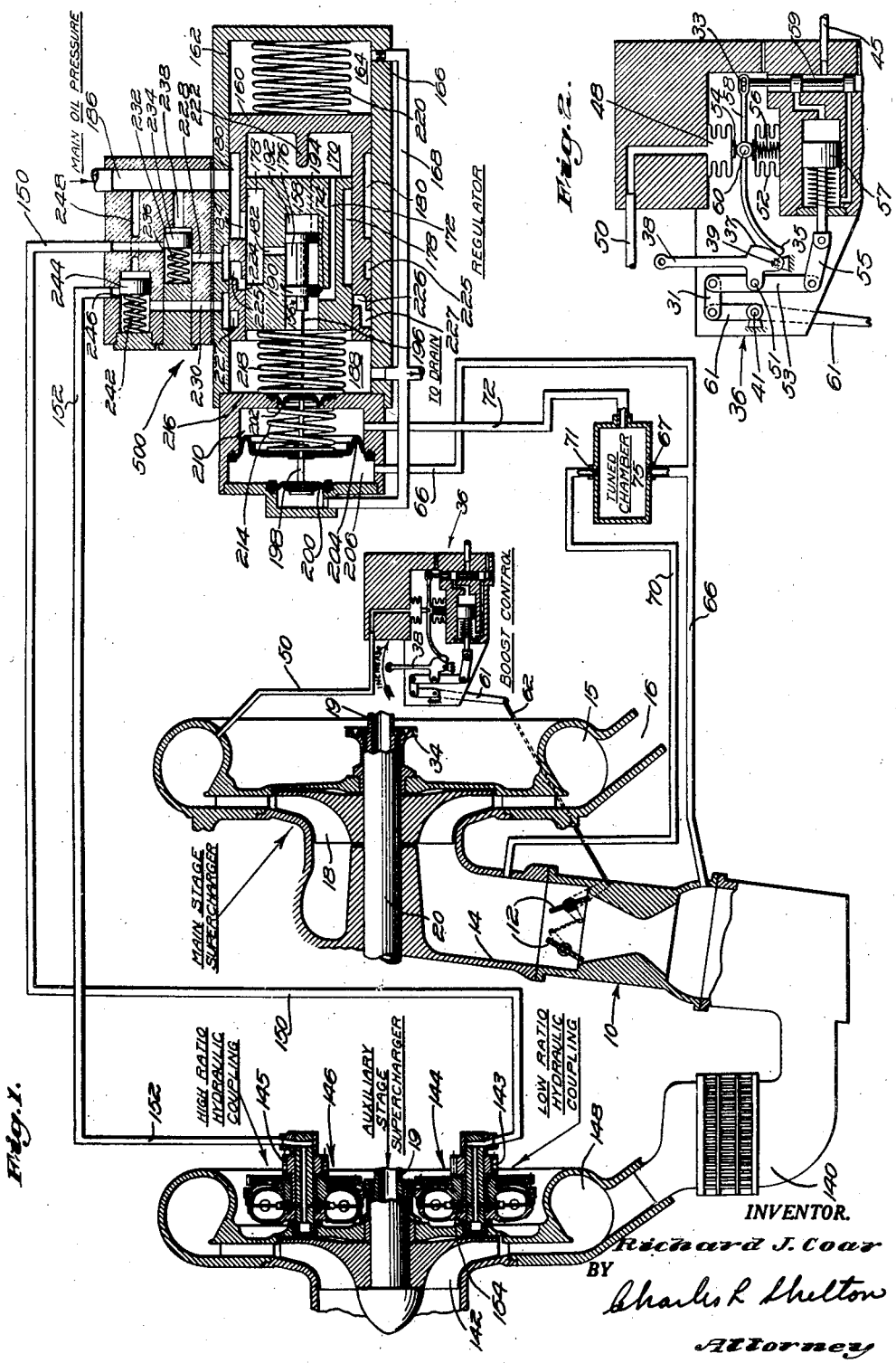
INVENTOR.
Richard J. Coar
BY Charles R. Shelton
Attorney

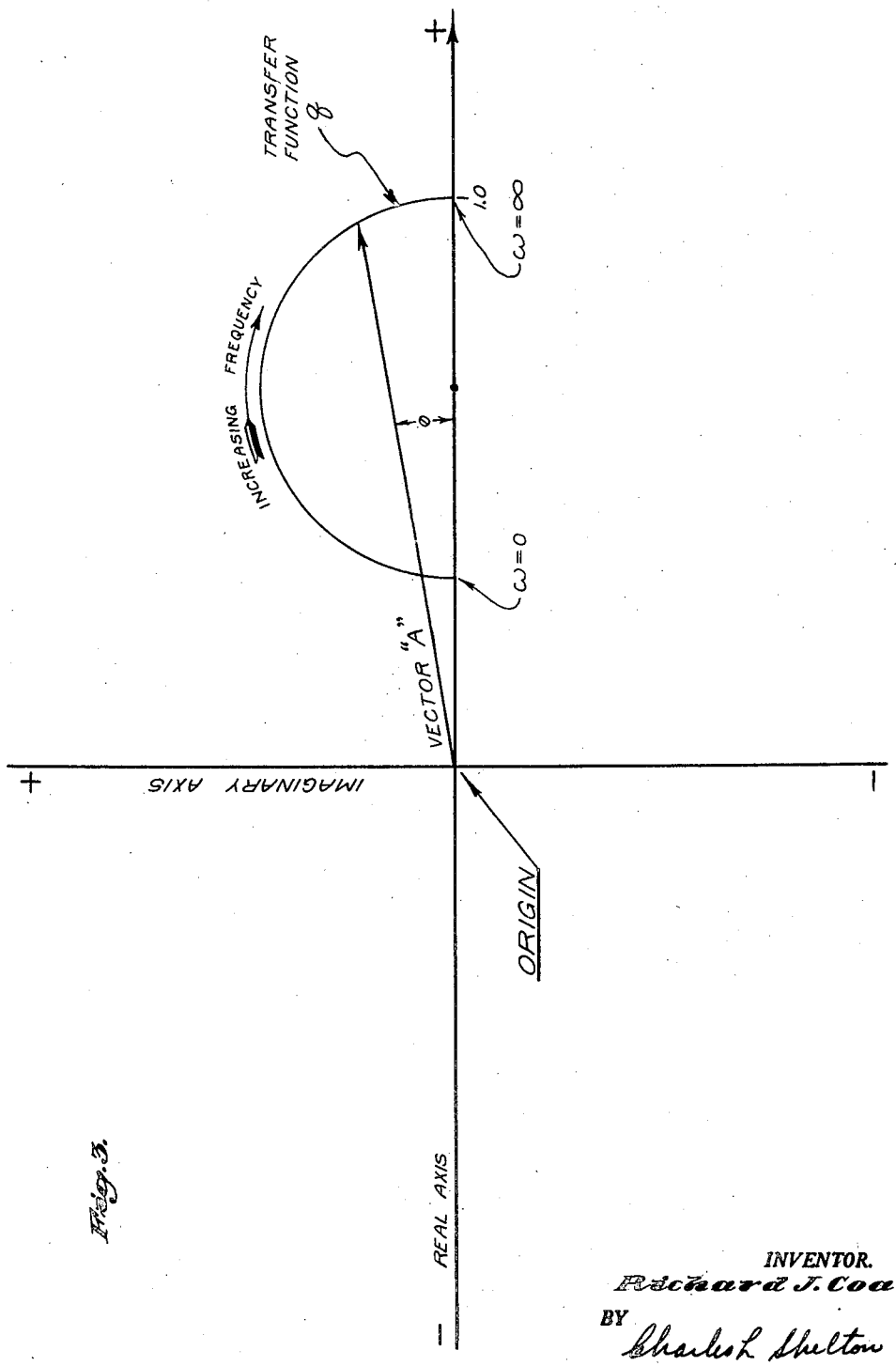

Patented Dec. 12, 1950

2,533,714

UNITED STATES PATENT OFFICE 2,533,714

SUPERCHARGER CONTROL

Richard J. Coar, Hartford, Conn., assignor to United Aircraft Corporation, East Hartford, Conn., a corporation of Delaware Application November 6, 1948, Serial No. 58,709

15 Claims. (Cl. 123—119)

This invention relates to an improvement in a control method and apparatus, particularly for hydraulically driven variable speed aircraft engine supercharging blowers, as described, for example, in my copending application Serial No. 749,430, filed May 21, 1947.

An object of this invention is to provide a stabilized control for the manifold pressure regulation of a supercharged engine. This stabilization permits an improved system whereby any change in the pilot's selection of manifold pressure is followed quickly by a corresponding change in manifold pressure. This is accomplished by introducing a phase lead or anticipation effect into the signal applied to a servomechanism which controls a supercharging system.

Another object is to provide an improved engine control device for varying the speed of an aircraft engine supercharger impeller in accordance with changes in the pressure drop across a flow restriction in the impeller passage by actuating the diaphragm of a regulator, the pressure drop being applied across a capacitance volume to provide a pressure which is applied to one side of said diaphragm while the pressure upstream of said restriction is applied to the other side. This capacitance volume, referred to as a tuned venting chamber, introduces a phase lead or anticipation effect which provides a high degree of stabilization in the operation of this control device.

Another object is to provide means for maintaining a pressure drop across the throttle of an internal combustion engine which pressure drop is predetermined, and may be held constant, at varying engine manifold pressures, especially at high engine speeds.

Another object of the invention is to provide an improvement in a control for an engine supercharger drive in which the pressure drop across the engine throttle is used to control the flow of fluid to fluid couplings in the supercharger drive.

Another object is to provide a stable combined proportional speed and proportional position control means adapted to regulate the pressure drop across an engine throttle by controlling the oil flow to an engine supercharger drive coupling, in which the instantaneous change in position of the oil flow control element is proportional to the deviation of the regulated pressure from the selected value and in which the time rate of change of position of the oil flow control element is proportional to the deviation of the regulated pressure from the selected value.

A further object is to provide improvements in the structure and operation of fluid pressure responsive flow control devices.

Other objects and advantages will be apparent from the specification and claims, and from the accompanying drawings which illustrate what is now considered to be a certain preferred embodiment of the invention.

Fig. 1 is a view, partly in section, showing a regulator and tuned venting chamber as used in a control system for a two-stage engine supercharger installation; and Fig. 2 is an enlarged detail view of the boost control.

Fig. 3 is a curve showing the characteristic of the tuning chamber.

While this invention is applicable to a single or multi-stage engine supercharger installation and with other type regulators, only one combination of installation, tuned chamber and regulator is shown and described here. A single stage installation and various type regulators are disclosed in my copending application, Serial No. 749,430, filed May 21, 1947.

One of the conventional types of control for regulating manifold pressure of an engine having the supercharger driven at variable speed by fluid couplings is the sequential control in which the throttle is opened fully before the fluid couplings are brought in or engaged. In such sequential systems the damping required to stabilize the control of the couplings hinders the response in transferring to part-throttle operation because the throttle cannot begin to close until minimum supercharging is obtained. Further, when operating in the variable supercharger speed range (full throttle) the response of the couplings is inherently slow and small variations in manifold pressure cannot be corrected by the supercharger speed control.

The present invention, in what is now considered its most important aspect, includes a control means which may be used to obviate the above enumerated and other defects of the sequential type of system by enabling throttle positions and supercharger speed to be simultaneously regulated, in a coordinated and stable manner. Stabilization is obtained by introducing an anticipation effect into the system. The throttle may be maintained in working (or partially closed) position at all times when the aircraft is below critical altitude for high blower, enabling changes in manifold pressure to be corrected by the boost control, making the throttle always ready to respond instantly to a change in demand, and eliminating any hindrance to quick response by supercharger control damping.

From another aspect, the invention includes a control means which may be used for improving the operation, and particularly the stability, of the sequential type, as well as of other types, of control systems.

Referring to the embodiment of the invention illustrated in Fig. 1, a two-stage supercharger system is shown including a main stage supercharger 18 which discharges into a collector ring 15 and engine induction pipes 16 and which is preferably driven by the engine through a gear train and/or fluid couplings (not shown) connecting the engine crankshaft with the gear 34 on the drive shaft 20 of the supercharger. Air is supplied to the supercharger 18 through the intercooler 140 and the carburetor 10 (including throttles 12) in the induction passage 14 from collector ring 148 of an auxiliary stage supercharger 142 driven by the engine through a gear train (not shown) which connects the drive gears 143, 145 for the low speed ratio and high speed ratio couplings 144, 146, respectively, with the drive shaft 19 that is connected to the engine crankshaft. Whenever the high ratio coupling 146 carries the supercharger load, ring valve 154 within the low ratio coupling 144 shuts off the flow of oil into this coupling so that coupling 144 does not constitute a drag under these conditions. For a more complete description of the operation of the fluid couplings and the ring valve 154, reference is made to Hobbs-Willgoos Patent No. 2,400,307, issued May 14, 1946.

The carburetor throttle valves 12 are operated by boost control 36 so as to regulate the manifold pressure in collector ring 15 and induction pipe 16 to the values selected by manually operable pilot's lever 38. Boost control 36 includes an expansible bellows 48 (Fig. 2) which communicates with the collector ring 15 by means of a conduit 50. A second bellows 52 opposing bellows 48 is evacuated and contains a spring 56 which constantly urges it into an expanded position. A manually operable pilot's lever 38, pivoted at 39 on a stationary fulcrum, has a cam surface 37 bearing against one end 35 of a lever 58 which is fulcrumed at 60 on a link 54 connecting bellows 48 and 52. Lever 58 is connected at its right-hand end through the pin and slot 33 to a pilot valve 59 which, depending upon its position, directs the flow of oil under pressure from conduit 45 to one side or the other of servo-piston 57 while connecting the other side to drain, or prevents all flow of oil to maintain piston 57 stationary. A link 55 connects the servo-piston rod with one end of a lever 53 pivoted at 51 on a projection of the pilot's lever. Another link 31 connects the upper end of lever 53 with the upper end of an arm 61 fulcrumed on a stationary pivot 41. The latter arm is connected with and actuates throttle valves 12 through link 62 as shown in Fig. 1. The arrangement is such that, for any given setting of the pilot's lever, an increase in manifold pressure above the selected value causes the bellows 48 to expand against the action of spring 56, thus rotating lever 58 downwardly about its end 35 to cause pilot valve 59 to move down, porting oil to the left side of piston 57 and moving it to the right so as to cause the throttle valves to move towards closed position until the manifold pressure drops to the selected value. The action is similar but opposite, upon a decrease in manifold pressure below the selected value. Movement of lever 38 about its pivot 39 variably positions end 35 of lever 58 thus selecting the manifold pressure maintained by the regulator.

Auxiliary supercharger impeller speed is separately and simultaneously controlled by a regulator generally indicated at 500. This regulator 500 accomplishes the performance of a control system without interconnecting linkages and with a single pilot valve. In this construction a pilot valve 156 is slidable within a metering valve 158. Metering valve 158 is slidable within a cylindrical liner 160 which in turn is slidable within a stationary housing 162. It will be noted that pilot valve 156, metering valve 158, liner 160 and housing 162 are all concentric. Housing 162 and liner 160 form a chamber 164 which is connected through a restriction, or bleed, 166 to a drain conduit 168 which discharges into a sump (not shown). This sump is located above the level of the control so that conduit 168 is maintained full of oil. Chamber 170 formed between metering valve 158 and liner 160 is connected by a passage 172 to port 174 which is alternately connected either to a source 186 of oil under substantially constant pressure through annular spaces and passages 176, 182, 178, 184 and 180, or to drain in chamber 188, depending on the disposition of pilot valve land 190 with respect to port 174. Chamber 192 between the pilot valve and the metering valve is connected by an axial passage 194 through the pilot valve to drain chamber 188. Pilot valve 156 is operated by a rod 196 connected to a diaphragm stem 198 to which are fixed two balancing diaphragms 200 and 202 and a pressure differential diaphragm 204. Chamber 206 on the left side of diaphragm 204 is vented to the upstream carburetor flange pressure by conduit 66 and chamber 210 on the right side of the diaphragm is vented to the tuned venting chamber 75 by conduit 72. Diaphragm 204 and stem 198 are urged to the left by a spring 214 acting against a wall 216 in the diaphragm housing. Valve 158 is urged to the right by relatively stiff spring 218 acting against the opposite side of the housing wall 216 and valve liner 160 is urged to the left by a relatively soft spring 220 acting against the right-hand end wall of the housing 162.

Springs 218 and 220 tend to hold metering valve 158 against a stop 222 in liner 160. The valve and liner are so designed that in such a position (with valve 158 in abutment with stop 222) ports 224 and 226 leading respectively to the annular chambers 225, 227 are both closed by the left-hand land on the metering valve. As valve 158 moves to the left, relative to the valve liner 160, port 224 is first opened, metering oil from source 186 by way of chamber 178 into chamber 225 and passage 228; then port 226 is opened metering oil from the passage 178 into chamber 227 and passage 230.

The pressure of oil in passage 228 acts with spring 232 to move piston valve 234 to the right to open port 236 leading to the low ratio hydraulic coupling 144 through passage 150. This motion of valve 234 is resisted by the main oil pressure in source 186, to which the valve piston is subjected by a passage 238, so that a constant pressure difference is provided across port 224. Pressure of the oil in passage 230 acts with spring 242 to move piston valve 244 to the right to open port 246 leading to the high ratio hydraulic coupling 146 through passage 152. This motion is resisted by main oil pressure in chamber 248 which is connected with the oil inlet 186. Valve 244 acts to throttle the oil flow through passage 230 so as to provide a constant pressure drop across port 226.

The above described elements of the construction cooperate to provide what may be termed proportional-position plus proportional-speed control, in the following manner.

The pilot valve 156 is hydraulically balanced by fluid communication through passage 194 so that the pressure differential enacting on the net area of diaphragm 204 is opposed only by the force of spring 214. Thus the position of diaphragm 204 and consequently the position of pilot valve 156 will bear a linear relationship to this pressure differential, valve 156 moving to the right as this differential increases. Port 174 cooperates with land 190 so that metering valve 158 follows the pilot valve 156 as the latter moves; i. e., as pilot valve 156 moves to the right, port 174 is opened to drain, thus relieving the pressure in chamber 170 and enabling spring 218 to move valve 158 to the right until land 190 again registers with or closes port 174. If the pilot valve 156 is moved to the left land 190 opens port 174 to main oil pressure in passage 186 by way of port 182 and this pressure acting in chamber 170 against valve 158 moves the latter to the left against the force of spring 218 until port 174 again registers with or is closed by land 190. The configuration of port 174 and land 190 is preferably such that the action of the metering valve 158 in following the movements of the pilot valve 156 is nearly instantaneous; that is, a change in position of the metering valve 158 is effected by a change in pressure differential with minimum lag. It will be apparent that by virtue of spring 218, the pressure in chamber 170 relative to the pressure in drain conduit 168 bears a linear relationship to the position of valve 158. As the metering valve position is maintained in linear relation to the predetermined pressure differential the pressure in chamber 170 will vary linearly with said differential but in the opposite sense; i. e., as the differential increases, pressure in chamber 170 decreases.

Liner 160 is urged to the right by pressure in chamber 170 and is urged to the left by spring 220. Spring 220 preferably has a low rate, so that in effect it is a constant effort spring and could by modification of the design be replaced by a constant effort hydraulic piston. The load provided by spring 220 is (by proper selection of the spring) made to balance the pressure achieved in chamber 170 when the pressure differential equals the desired value; i. e., when the desired value is obtained (and then only) spring 220 balances the pressure in chamber 170 and the liner 160 is static. Whenever the pressure in chamber 170 does not balance the force of spring 220 (the pressure differential being above or below the selected value) then liner 160 is moved relative to metering valve 158 so as to vary the oil flow to the couplings through ports 224, 226 until the carburetor loss, and consequently the pressure in chamber 170, is returned to the selected value. However, this action of liner 160 is delayed in time, relative to movements of the metering valve, by the effect of flow restriction 166. Thus, the compensating or readjusting movements of liner 160 occur only at a relatively slow rate, following a movement of the metering valve, or following a transient.

If the pressure differential should increase above the selected value metering valve 158 is moved to the right relative to liner 160 tending to close ports 226 and 224 (or either of them) in that order and reducing the oil flow to the couplings, thereby reducing the supercharging and the carburetor loss. A reverse action results when the pressure differential falls below the selected value. Assuming that liner 160 were fixed, this would result in a different pressure differential for each metering valve position. However, the increased differential above the selected value produces pressure in chamber 170 less than that obtained at the desired setting. The force of spring 220 being then greater than the pressure in chamber 170, it urges liner 160 to the left, which closes ports 226 and 224 (or either of them), thereby reducing the differential until the desired value is achieved. This action of liner 160 is delayed by the restriction 166 (since oil must enter or leave chamber 164 through the restriction whenever liner 160 moves relative to housing 162) so that the liner acts in a manner to gradually reset the regulator following a transient.

When a transient is imposed on the engine resulting in a decrease in pressure differential below the selected value metering valve 158 is moved to the left so as to increase the oil flow to the couplings and the pressure in chamber 170 is increased above the equilibrium value overpowering spring 220 and tending to move liner 160 to the right, thus further opening the ports which regulate the flow of oil to the couplings. However, the motion of liner 160 is restricted, or damped, by the hydraulic restriction 166 since chamber 164 is filled with oil and as liner 160 moves this oil must flow in or out through the restriction 166. The pressure drop across restriction 166 is proportional to the error in the pressure differential (the pressure in chamber 164 is always less than the pressure in chamber 170 by a fixed amount, determined by the force of spring 220, necessary to establish equilibrium of forces acting on liner 160). Therefore, if the restriction 166 is designed (for instance as a long passage of small cross sectional area) so as to have essentially capillary characteristics (flow rate proportional to pressure drop) the time rate of motion of liner 160 and of the resultant opening or closing of the coupling oil flow regulating ports 224, 226 may be made proportional to the error of the controlled variable. This characteristic is generally termed proportional-speed response.

The amount of opening of ports 224, 226 and therefore the rate of flow of oil to the couplings is determined then by the proportional-position action of metering valve 158 and by the proportional-speed action of metering liner 160. Obviously, this construction is equally applicable to single-stage engines as to two-stage engines.

The subject matter disclosed so far is essentially disclosed in my copending application, Serial No. 749,430, filed May 21, 1947, and the inventive part of the present control is now described. This improved control is used to stabilize the auxiliary supercharger at high R. P. M.'s of the engine where it was found that extra stabilization was needed.

Regulator 500, the operation of which is described above, has as its operating pressure differential the pressure drop across restriction 67; i. e., the pressure difference between the pressure in line 66 and the pressure in line 72 and which will be referred to hereinafter as $P_{66}-P_{72}$. Under conditions of constant speed of supercharger

18 and constant manifold pressure 15 as controlled by boost control 36, the downstream throttle pressure in pipe 14 is maintained essentially constant. During steady-state operation of the auxiliary stage supercharger 142 this operating pressure differential $P_{66}-P_{72}$ is some fraction of the carburetor loss, or throttle pressure drop, which will be referred to as $P_{66}-P_{70}$. However, if the speed of auxiliary supercharger 142 should vary, which we define as a transient, the pressure in chamber 75 does not immediately respond, and the change in pressure differential $P_{66}-P_{72}$ applied to regulator 500 is greater than the fraction received under steady-state conditions. This augmentation gives the necessary anticipation or phase lead required to stabilize the system. It can be shown that when $P_{70}$ is constant the pressure difference $P_{66}-P_{72}$ always has a phase lead relative to pressure difference $P_{66}-P_{70}$; the frequency response transfer function, $q$, of $P_{66}-P_{72}$ relative to $P_{66}-P_{70}$ is:

$$q = \frac{P_{66}-P_{72}}{P_{66}-P_{70}}(j\omega) = \frac{j\omega\tau - 1}{j\omega\tau - 1 - B}$$

Where $\tau$ is the time constant in seconds of the tuning system, as determined by the size of the chamber 75 and the restriction 71, and $B$ is determined by the relative sizes of restrictions 67 and 71, $\omega$ is the frequency in radians/sec. at which $P_{66}$ is varied.

If this transfer function is plotted in the form of a so-called Nyquist curve, the response is found to be similar to Fig. 3. The length of vector "A" describes the ratio $(P_{66}-P_{72}) \div (P_{66}-P_{70})$, and the angle $\theta$ describes the phase lead of $P_{66}-P_{72}$ relative to $P_{66}-P_{70}$. In use, the variables are adjusted to give the most phase lead at the frequency $\omega$ which is most difficult to stabilize.

In the operation of the control system shown in the drawings for a two-stage engine supercharger installation, air from the free air stream enters the auxiliary stage supercharger 142 in which it is compressed and delivered to collector ring 148. From there it is delivered through intercooler 140 and carburetor 10 to the main stage supercharger 18. After compression in supercharger 18, the air is delivered by way of collector ring 15 and intake pipe 16 to the engine cylinders. Carburetor throttle valves 12 are operated by the boost control 36 (above described) so as to regulate manifold pressure in the intake pipes 16 to the value selected by the manually operable pilot's lever 38. The carburetor loss, or the value of the pressure drop to be maintained across the restriction 67 (above described) is determined by the load provided by spring 220 of the regulator 500 and by the relative sizes of restrictions 67 and 71. The pilot selects an increased manifold pressure by moving lever 38 of boost control 36 to the right as indicated in the figures, this opens throttle valves 12 and the manifold pressure increases to the selected value. This action of opening the throttle valves 12 decreases the pressure drop across the valves and restriction 67; since the pressure drop is to be kept constant, the regulator 500 moves in a direction to increase the speed of the auxiliary stage supercharger 142. This restores the pressure drop to its predetermined value.

The use of tuned chamber 75 with associated restrictions 67 and 71 provides stable regulation of the predetermined pressure drop by providing regulator 500 with sufficient anticipation to prevent undamped oscillatory variations in the speed of auxiliary supercharger 142.

While only one embodiment of the invention has been shown and described herein, it will be understood that the invention is not limited to the details of construction, or of the specific combination and arrangement of elements herein illustrated, but covers all such forms as fall within the scope of the appended claims.

I claim:

1. In an induction system for an engine, a supercharger and a throttle in said induction system, means including a variable slip fluid coupling for driving said supercharger, and means responsive to the pressure drop across said throttle for controlling the speed of said supercharger by varying the slip of said fluid coupling, said last named means including a tuned venting chamber for stabilizing the control.

2. In an induction system for an engine, a main stage supercharger, an auxiliary stage supercharger whose outlet is connected to the inlet of the main stage supercharger by a fluid passage, and a carburetor located therebetween, means including a tuned venting chamber responsive to the pressure drop across said carburetor for varying the speed of the auxiliary stage supercharger.

3. In an induction system for an engine, a supercharger and a throttle in said induction system, means responsive to the pressure drop across said throttle for controlling the speed of said supercharger, said last named means including a tuned venting chamber for stabilizing the control.

4. A supercharger for an engine, a variable speed ratio transmission for driving said supercharger at a variable speed relative to said engine, means for varying the speed ratio of said transmission with changes in the position of a control element, means including a tuned venting chamber for relatively quickly changing the position of said control element by amounts proportional to deviations from a predetermined value of a fluid pressure that is affected by the speed of said supercharger and resetting means for relatively slowly adjusting said control element until said fluid pressure is returned to said predetermined value.

5. In combination, a pair of compressors arranged in series in a fluid passage, a throttle in said fluid passage for controlling the delivery pressure of the downstream compressor, and means including a tuned venting chamber for varying the output of the upstream compressor in accordance with variations in the fluid pressure drop across said throttle.

6. In an induction system for an engine, a supercharger, a carburetor, a tuned venting chamber comprising a pair of flow restrictions separated by a capacitance volume, said tuned venting chamber being connected across said carburetor, and a regulator responsive to the pressure differential between the pressure in the tuned venting chamber and the pressure on one side of said carburetor for controlling the speed of said supercharger.

7. In an induction system for an engine, a supercharger, a throttle valve, a tuned venting chamber comprising a pair of flow restrictions separated by a capacitance volume, said tuned venting chamber being connected across said throttle valve, and a regulator responsive to the pressure differential between the pressure in the tuned venting chamber and the pressure on one side of said throttle valve for controlling the speed of said supercharger.

8. An apparatus for controlling the flow of a fluid comprising, a passage for a fluid, a blower and a Venturi section located in said passage, a tuned venting chamber connected across said Venturi section having a restriction in each connection to either side of said Venturi section, and a regulator including a diaphragm for controlling the speed of said blower, said regulator being responsive to the pressure differential between the pressure in the tuned venting chamber and the pressure on one side of said Venturi section, said differential being imposed across said diaphragm.

9. In combination with an induction system of an engine comprising a main stage supercharger driven by said engine, a fluid coupling, an auxiliary stage supercharger driven by said engine through said fluid coupling, an induction passage connecting said superchargers, a carburetor located in said passage having a throttle therein, a tuned venting chamber having two restrictions connected across said carburetor, said connection consisting of a passage connecting one side of said carburetor with said chamber through one restriction and another passage connecting the other side of said carburetor with said chamber through the other restriction, a regulator responsive to the pressure differential between the pressure in the tuned venting chamber and the pressure on one side of the carburetor for controlling the speed of said auxiliary stage supercharger by varying the slip of said fluid coupling.

10. An apparatus for controlling the flow of a fluid comprising, a passage for a fluid, a blower and a throttle located in said passage, a regulator including a diaphragm for controlling the speed of said blower, and means including a tuned venting chamber connecting said regulator across said throttle for providing a phase lead to said regulator.

11. An induction system for an engine comprising, an induction passage, a supercharger and a carburetor located in said passage, regulating means connected across said carburetor for controlling the speed of said supercharger, said connection having a tuned chamber for providing a phase lead to said regulator.

12. An induction system for an engine comprising, an induction passage, a supercharger and a throttle located in said passage, a regulator responsive to a pressure differential for controlling said supercharger, means imposed across said throttle for providing a pressure differential to said regulator which is less than the pressure drop across said throttle, said last named means including a tuned chamber for providing a phase lead to said regulator.

13. In an engine induction system, an induction passage, a supercharger and a carburetor located in said passage, a boost control device for maintaining a predetermined pressure on the downstream side of said carburetor, and means responsive to the pressure drop across said carburetor for controlling the speed of said supercharger including chamber means for providing a phase lead into said responsive means for stabilizing the control.

14. In an engine induction system, an induction passage, a supercharger and a throttle located in said passage, a boost control device for maintaining a predetermined pressure on the downstream side of said throttle and means responsive to the pressure on the upstream side of said throttle for controlling the speed of said supercharger, said last named means including a device for stabilizing the control which includes a tuned venting chamber.

15. In combination with an engine, an induction system comprising, an induction passage, a supercharger and a throttle located in said passage, a regulator responsive to a pressure differential for controlling said supercharger, means imposed across said throttle for providing a pressure differential to said regulator which is less than the pressure drop across said throttle, said last named means including a tuned venting chamber in series with two restrictions which provide for a phase lead to said regulator.

RICHARD J. COAR.

REFERENCES CITED

The following references are of record in the file of this patent:

UNITED STATES PATENTS

| Number | Name | Date |
| --- | --- | --- |
| 2,400,306 | Hobbs | May 14, 1946 |